Figure 1:
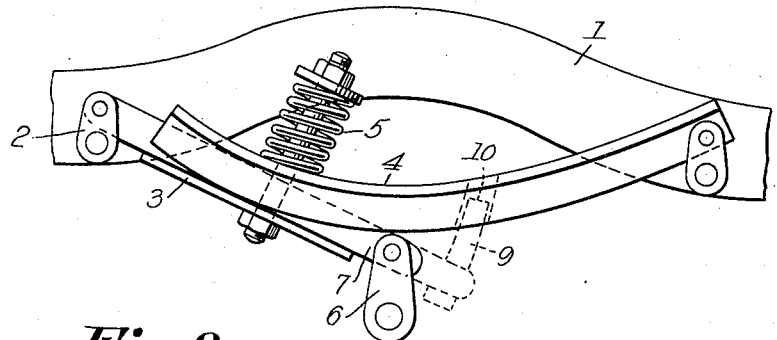

July 13, 1937.  B. MARTINS  2,086,721
WHEEL SUSPENSION FOR VEHICLES OR THE LIKE
Filed May 31, 1935

Inventor:
BORGE MARTINS.
By Harness Dickey Pierce and Haun
Attorneys.

Patented July 13, 1937

2,086,721

UNITED STATES PATENT OFFICE 2,086,721

WHEEL SUSPENSION FOR VEHICLES OR THE LIKE

Børge Martins, Copenhagen, Denmark

Application May 31, 1935, Serial No. 24,323
In Denmark January 2, 1935

2 Claims. (Cl. 267—20)

The present invention relates to wheel suspensions, especially for vehicles, and more particularly to an improved wheel suspension, which is useful in combination with vehicles intended to be driven with varying loads.

The invention has for its object to provide a practically useful wheel suspension making it possible, without the use of relatively large springs, to attain a soft and well balanced driving, when the vehicle is carrying a large load as well as when it is empty.

For this purpose the wheel axle is suspended, in known manner, in one or more swinging arms actuated partly by the wheel load and partly by a spring load, which compensates the wheel load, the said arm or arms resting against a firm or yielding support with a curved contacting surface. When such arms are swinging under the influence of the wheel-load, the ratio of the spring load moment to the wheel-load moment will be altered as the arm is rolling on the support, in such a manner that the advantage can be attained that the spring acts only with a small moment when the load is small, but with a large moment, when the load is large.

Known devices of this kind suffer from the drawback that besides the intended mutual rotation of the lever relatively to the support a sliding motion between the said members may take place, which may cause an undesirable play or, under especially unfortunate circumstances, may cause the lever to be torn entirely free of the support, if the wheel be exposed to an uncommonly violent blow.

The present invention has for its object to improve the said wheel suspensions by the provision of means to prevent the occurrence of any such sliding of the parts on one another, or of any pulling apart of the same.

According to the invention, this result is attained in that the lever and the support have mutually engaging projections and recesses adapted to prevent the lever from sliding relatively to the support.

An especially simple way is to form the support and the lever as profiled members fitting into one another. Hereby, however, merely a sliding transversely to the plane of swinging of the device will be prevented and it will therefore generally be necessary further to use other means preventing a sliding in the longitudinal direction of the profiled members.

For this purpose the lever or the support may be fitted with a projection engaging a corresponding recess in the other part, or flexible steel bands or the like may be used for connecting the parts in such a manner that the desired rotary motion can freely be performed. Finally both parts may be fitted with mutually engaging teeth allowing the rotary motion to be performed freely.

The drawing illustrates by way of example a few constructions of the invention.

Figure 2:
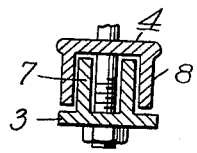
Figure 3:
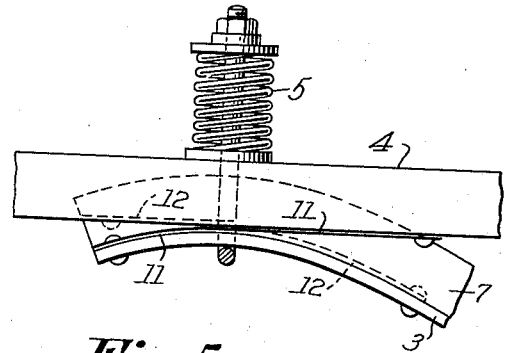
Figure 4:
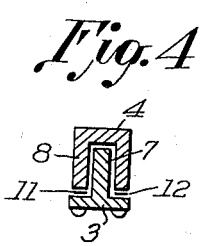
Figure 5:
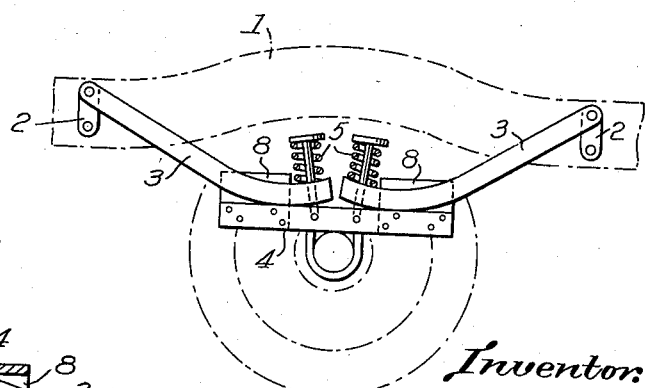
Figure 6:
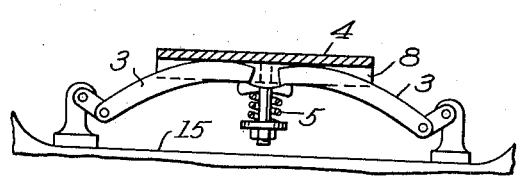

Fig. 1 shows a wheel suspension, in side elevation,

Fig. 2 a cross-section of the lever and the support,

Fig. 3 another construction, in side elevation,

Fig. 4 a corresponding cross-section,

Figs. 5 and 6 two further constructions in side elevation.

In the construction shown in Fig. 1, there are suspended, in swinging hangers 2 on the supporting frame 1 of the vehicle, a lever 3 and a support 4, which are maintained pressed against one another by a spring 5, and which are adapted to roll on one another on a curved surface, in such a manner that the lever arm of the spring in a known manner automatically will be increased, at the same time as the load on the lever 3 is increased. On the lever 3, a bearing 6 for the wheel axle is suspended.

According to the invention, the lever 3 and the support 4 are formed as profiled members fitting into one another with projections 7 and 8, respectively, which fit into one another in such a manner that any sliding of the lever on the support transversely to the plane of oscillation will be prevented. As shown by dotted lines in Fig. 1, the lever 3 may further be fitted with a projection 9, for instance in the shape of a pin engaging a recess 10 in the support 4, and thereby also a longitudinal sliding of the profiled members will be prevented.

In the construction shown in Figs. 3 and 4, the lever 3 and the support 4 which may be a part of the supporting frame for the vehicle are also shaped as profiled members. In order to prevent a sliding in the longitudinal direction of the profiles, the lever and the support are interconnected by means of long flexible connecting members 11 and 12, one end of which is connected to the lever or the support on one side of the point of contact of the same, whereas the other ends of the said connecting members are connected to the other part on the other side of the point of contact. It is especially suitable to use thin steel bands for this purpose.

In the construction shown in Fig. 5, two levers 3 are used co-operating with a support 4 fitted with projections 8 embracing the levers 3 so as to prevent any lateral movements.

In the construction shown in Fig. 6, the levers 3 are suspended on the rear axle 15 of the vehicle, whereas the support 4 with the projections 8 forms a part of the supporting frame of the vehicle. Also in this construction two levers 3 are used.

The manner in which the springs are caused to act on the levers is only shown on the drawing by way of illustration, but not by way of limitation.

The construction shown in Fig. 1 is especially suitable for the object in view, as the same, without the underframe of the vehicle having to be altered, may be substituted for already existing wheel suspensions on vehicles. This is especially feasible because the suspension on the underframe can be effected by means of the already existing swinging hangers, there being used a lever 3 suspended in one hanger and resting against a yielding support 4 suspended in the other hanger, and the said parts being maintained pressed against one another by one or more springs.

In new work, it will in many cases be an advantage to use one of the constructions using a fixed support, which may be an especially profiled part of the supporting frame.

I claim:

1. Wheel suspension comprising in combination a lever system adapted to be actuated partly by the wheel load and partly by a spring load compensating the same and contacting a support along a curved surface, said lever system and said support being interconnected by means of flexible connecting straps passing over the contacting surfaces, projections on one of said members adapted to embrace partly the other member.

2. In combination with a pair of relatively movable parts, means including a rocker and a track for said rocker interconnecting said parts, resilient means constantly urging said rocker toward one limit of its rockable position with respect to said track whereby to urge said parts toward one limit of their movable positions, and means for preventing sliding of said rocker longitudinally of said track comprising a pair of flexible members each connected at one end relative to said rocker and at the opposite end relative to said track, the points of connection of said flexible members with said track being on opposite sides of the normal area of engagement of said rocker therewith and the points of connection of said flexible members with said rocker being on opposite sides of said area and on that side thereof opposite to which the opposite end of the corresponding flexible member is connected relative to said track.

BØRGE MARTINS.